(12) United States Patent
Lv et al.

(10) Patent No.: US 12,528,195 B2
(45) Date of Patent: Jan. 20, 2026

(54) ROBOT WELDING METHOD AND SYSTEM BASED ON SEMANTIC FEATURE CLUSTERING

(71) Applicant: QINGDAO UNIVERSITY OF TECHNOLOGY, Qingdao (CN)

(72) Inventors: Chengxing Lv, Qingdao (CN); Jian Chen, Qingdao (CN); Yuguo Zhou, Qingdao (CN); Xinli Xu, Qingdao (CN); Zhibo Yang, Qingdao (CN); Yuxia Yang, Qingdao (CN); Yongling Wu, Qingdao (CN); Qian Gao, Qingdao (CN); Xia Lv, Qingdao (CN); Huamin Zhao, Qingdao (CN); Jiheng Yu, Qingdao (CN); Yinghui Dong, Qingdao (CN)

(73) Assignee: QINGDAO UNIVERSITY OF TECHNOLOGY, Qingdao (CN)

( * ) Notice: Subject to any disclaimer, the term of this patent is extended or adjusted under 35 U.S.C. 154(b) by 183 days.

(21) Appl. No.: 18/287,115

(22) PCT Filed: May 20, 2021

(86) PCT No.: PCT/CN2021/087431
§ 371 (c)(1),
(2) Date: Oct. 16, 2023

(87) PCT Pub. No.: WO2022/217531
PCT Pub. Date: Oct. 20, 2022

(65) Prior Publication Data
US 2024/0367323 A1    Nov. 7, 2024

(30) Foreign Application Priority Data
Apr. 15, 2021    (CN) .......................... 202110407179.2

(51) Int. Cl.
*B25J 9/16*    (2006.01)
*B25J 11/00*    (2006.01)

(52) U.S. Cl.
CPC ............. *B25J 9/1697* (2013.01); *B25J 9/161* (2013.01); *B25J 9/163* (2013.01); *B25J 9/1646* (2013.01); *B25J 11/005* (2013.01)

(58) Field of Classification Search
CPC . B25J 11/005; B25J 9/161; B25J 9/163; B25J 9/1646; B25J 9/1697; B25J 9/1656;
(Continued)

(56) References Cited

U.S. PATENT DOCUMENTS 8,352,465 B1 * 1/2013 Jing ...................... G06F 16/583
707/723
10,515,379 B2 * 12/2019 Gupta ................. G06Q 30/0201
(Continued)

FOREIGN PATENT DOCUMENTS

CN        109285139         1/2019
CN        109623817 A   *   4/2019   ............ B25J 9/1656
(Continued)

OTHER PUBLICATIONS

He, Kaiming, et al. "Deep residual learning for image recognition." Proceedings of the IEEE conference on computer vision and pattern recognition. 2016. (Year: 2016).*
(Continued)

*Primary Examiner* — Adam R Mott
*Assistant Examiner* — James Miller Watts, III
(74) *Attorney, Agent, or Firm* — Jiwen Chen; Joywin IP Law PLLC

(57) ABSTRACT

A robot welding method based on semantic feature clustering; the method comprises: acquiring an image of a workpiece, and generating an image training sample set; performing semantic annotation on the image of the workpiece to
(Continued)

generate a semantic training sample set; establishing a semantic clustering model, and training same by using the image training sample set and the semantic training sample set; by using the trained semantic clustering model, identifying an image of a workpiece to be welded, so as to obtain data of the workpiece to be welded; on the basis of the data of the workpiece to be welded and by using parameterized online programming, generating a welding program for the workpiece to be welded; and on the basis of the welding program, executing welding of the workpiece to be welded. By means of the robot welding method based on semantic feature clustering, neither teaching programming nor offline programming is required, thereby improving the precision, efficiency, universality and flexibility. Further provided is a robot welding system based on semantic feature clustering.

2 Claims, 3 Drawing Sheets

(58) Field of Classification Search
CPC . Y02P 90/30; G06T 7/344; G06T 7/33; G06T 7/246; G06T 2207/20081; G06T 2207/30108; G06T 7/0004; G06T 7/60; G06T 7/13; G06N 3/045; G06F 18/24; G06F 18/241; G06V 10/764; G06V 10/26
See application file for complete search history.

(56) References Cited

U.S. PATENT DOCUMENTS

| | | | |
|---|---|---|---|
| 2020/0104650 A1* | 4/2020 | Huang | G06V 10/454 |
| 2022/0101140 A1* | 3/2022 | Satheesh Kumar | G06N 20/00 |

FOREIGN PATENT DOCUMENTS

| | | | | |
|---|---|---|---|---|
| CN | 110059741 | | 7/2019 | |
| CN | 110135513 | | 8/2019 | |
| CN | 110524580 A | * | 12/2019 | B25J 19/04 |
| CN | 110893525 | | 3/2020 | |
| CN | 112465748 A | * | 3/2021 | G06N 3/045 |
| WO | WO2019238976 | | 12/2019 | |

OTHER PUBLICATIONS

Translation of CN-110524580-A (Year: 2019).*
Translation of CN-112465748-A (Year: 2021).*
Translation of CN-109623817-A (Year: 2019).*

* cited by examiner

ROBOT WELDING METHOD AND SYSTEM BASED ON SEMANTIC FEATURE CLUSTERING

This is a U.S. national stage application of PCT Application No. PCT/CN2021/087431 under 35 U.S.C. 371, filed May 20, 2021 in Chinese, claiming priority of Chinese Application No. 202110407179.2, filed Apr. 15, 2021, all of which are hereby incorporated by reference.

TECHNICAL FIELD

The present invention relates to the field of welding robots, specifically focusing on a robot welding method and a system that utilizes semantic feature clustering.

BACKGROUND TECHNOLOGY

Welding robots play a crucial role in in various fields, such as construction machinery, automobiles and their components, rail transit, and others. They are capable of performing repetitive tasks continuously, sometimes numbering in the tens of thousands or even hundreds of thousands. As a result, they are gradually replacing manual welding and significantly enhancing the intelligence and automation of welding production.

In modern industry, there is an increasing prevalence of small to medium-sized components with complex structures. This necessitates highly efficient, high-precision, and intelligent robotic welding manufacturing technology.

Currently, there are two primary programming methods employed for welding robots-teach-in programming and offline programming. In teach-in programming, operators utilize a teach pendant provided by the manufacturer to manually guide the robot to the required positions, recording each point along the path. The robot then follows this path based on the taught points, performing the welding task repeatedly. This method is particularly suitable for high-volume and high-consistency work. However, manual teaching suffers from poor accuracy and low efficiency, making it unsuitable for meeting companies' needs for multi-variety, high-volume, and rapid production.

On the other hand, offline programming uses offline software to program on the computer with reference to the workpiece information. Once the program is completed, it can be copied to the storage device or transferred to the robot controller via the network. After the coordinates of the workpiece have been matched, the program can be called up repeatedly. However, this method typically limits one program to describe only one action. If the position of the workpiece changes, the program needs to be rewritten to ensure stable operation. This not only increases the workload of the engineers but also causes issues related to versatility and flexibility. And if there is a deviation between the digital model and the real object, the program cannot be executed.

SUMMARY OF THE INVENTION

To address the challenges associated with applying existing welding robots to components with small batch sizes, large dimensions, and complex structures, the present invention proposes a robot welding method and a system based on semantic feature clustering. The method utilizes semantic feature clustering to extract deep features from workpiece images for identification. Subsequently, for different workpieces, it employs parameterized online programming techniques to form complete program scripts based on similar features within the workpieces using variables. This automation generates welding programs for the workpieces, eliminating the issues related to low precision and efficiency in manual teaching programming and the generality, flexibility, and deviation associated with offline programming.

The present invention employs the following technical solutions:

A robot welding method based on semantic feature clustering, wherein comprising: acquiring workpiece images, generating an image training sample set; semantically annotating the workpiece images to generate a semantic training sample set; establishing a semantic clustering model, using the image training sample set and the semantic training sample set for training; utilizing the trained semantic clustering model to recognize workpiece images to be welded, obtaining data about the workpieces to be welded; generating welding programs for the workpieces to be welded based on the data about the workpieces to be welded using parameterized online programming; and performing welding on the workpieces to be welded based on the welding programs.

Further, the establishment of the semantic clustering model comprises: using a Resnet50 model with the image training sample set as input to extract shallow features of the workpiece images; using a Resnet50 model with both the image training sample set and the semantic training sample set as input to extract semantic features of the workpieces; and fusing the shallow features and semantic features.

Further, the fusion of shallow features and semantic features comprises: assigning weights to the semantic features based on $$\alpha = \frac{m \times A}{m \times A + m \times B};$$

assigning weights to the shallow features based on $\beta = 1 - \alpha$; and performing weighted overlay fusion to obtain the fused feature based on $T = \alpha V + \beta U$; wherein, m represents the number of samples, A represents the clustering results of shallow features, B represents the clustering results of semantic features, V represents semantic feature expressions, and U represents shallow feature expressions.

Further, generating welding programs for the workpieces to be welded based on the data about the workpieces to be welded using parameterized online programming comprises: analyzing process characteristics and structural features of the workpieces to be welded to generate welding program modules; extracting common features of the workpieces to be welded, replacing welding data associated with common features with variables to generate common feature programs; and using data about the workpieces to be welded to assign values to variables corresponding to welding data for common features, thereby generating welding programs.

A robot welding system, which utilizes semantic feature clustering, consists of a welding robot that is specifically designed to perform machining on the workpieces requiring welding. Moreover, there is an image acquisition module that is responsible for capturing images of the workpieces that need to be welded. Additionally, an edge computing server is incorporated into the system. The server is responsible for training a semantic clustering model, which is then used to recognize images of the workpieces requiring welding and gather relevant data about them. The training of the semantic clustering model involves semantically annotating the workpiece images to create a semantic training sample set. This set is then used to establish and train the semantic clustering model, utilizing both the image training sample set and the semantic training sample set. Furthermore, the system includes a programmable logic control module that generates welding programs for the targeted workpieces. These programs are created based on the data about the workpieces and employ parameterized online programming techniques. Lastly, the system consists of a robot control module which retrieves the welding programs generated by the programmable logic control module and uses them to command and control the welding robot for carrying out welding operations.

Further, the establishment of the semantic clustering model comprises: using a Resnet50 model with the image training sample set as input to extract shallow features of the workpiece images; using a Resnet50 model with both the image training sample set and the semantic training sample set as input to extract semantic features of the workpieces; and fusing the shallow features and semantic features.

Further, the fusion of shallow features and semantic features comprises: assigning weights to the semantic features based on $$\alpha = \frac{m \times A}{m \times A + m \times B};$$

assigning weights to the shallow features based on $\beta=1-\alpha$; and performing weighted overlay fusion to obtain the fused feature $T=\alpha V+\beta U$; wherein, m represents the number of samples, A represents the clustering results of shallow features, B represents the clustering results of semantic features, V represents semantic feature expressions, and U represents shallow feature expressions.

Further, the programmable logic control module is configured to analyze process characteristics and structural features of the workpieces to be welded to generate welding program modules, to extract common features of the workpieces to be welded, replace welding data associated with common features with variables to generate common feature programs, and to use data about the workpieces to be welded to assign values to variables corresponding to welding data for common features, thereby generating welding programs.

Compared with the prior art, in the robot welding method and system based on semantic feature clustering proposed by the present invention, shallow and deep features of workpiece images are fused to enhance the accuracy of image semantic clustering. This enables rapid image clustering and determination of the workpiece type through image recognition. Data about the workpieces is extracted from a database, and welding programs are automatically generated using parameterized programming techniques. The programmable logic control module interacts with the robot control module to achieve robot welding of small batch, various types, and large-sized workpieces, eliminating the need for teaching programming and offline programming. This approach addresses the issues related to low precision and efficiency in manual teaching programming and the generality, flexibility, and deviation associated with offline programming.

BRIEF DESCRIPTION OF THE DRAWINGS

In order to illustrate the technical solutions of the embodiments of the present invention more clearly, the following briefly introduces the accompanying drawings used in the description of the embodiments. Obviously, the drawings in the following description are only some embodiments of the present invention. For those of ordinary skill in the art, other drawings can also be obtained from these drawings without any creative effort.

DETAILED DESCRIPTION OF THE INVENTION

Figure 1:
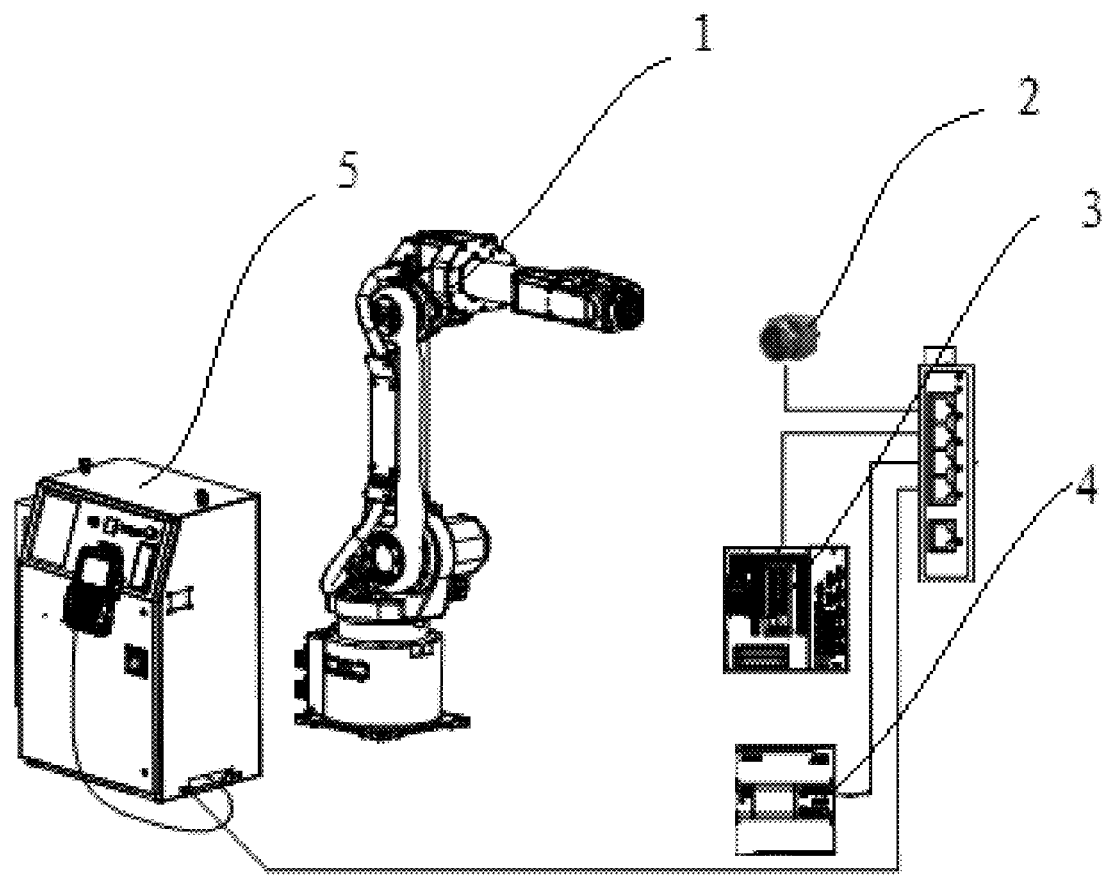
FIG. 1 is an architecture diagram of a robot welding system based on semantic feature clustering according to the present invention.

In the following sections, we will provide a comprehensive description of the technical solutions presented in the embodiments of the present invention, along with reference to the accompanying drawings. It is important to note that the embodiments we describe here represent only a portion of the complete range of embodiments within the scope of the present invention. All other embodiments that individuals with ordinary skills in the relevant field can derive without requiring creative efforts fall under the protective scope of this invention.

In the description of the present invention, terms like "center," "upper," "lower," "front," "rear," "left," "right," "vertical," "horizontal," "top," "bottom," "inner," "outer," etc., are used to convey spatial relationships based on the orientations shown in the drawings. These terms are employed for clarity and convenience in explaining the invention and do not imply that a specific orientation, construction, or operation is mandatory for the device or element. Therefore, they should not be construed as limiting the scope of the invention.

Furthermore, when we use terms like "installed," "connected," and "connected," we mean them in a broad sense unless otherwise explicitly specified. For instance, they can refer to fixed or detachable connections or integral connections, depending on the specific context. Those with expertise in the field will understand the precise meanings of these terms in the context of the present invention.

In our descriptions of the embodiments, features, structures, materials, or characteristics may be combined in various ways, as needed. The terms "first" and "second" are used solely for descriptive purposes and do not indicate relative importance or imply a fixed number of technical features. Therefore, a feature labeled as "first" or "second" may encompass one or more instances of that feature. Finally, unless otherwise stated, "plurality" means two or more.

The robot welding method based on a semantic feature clustering proposed by the present invention is applied in a robot welding system based on semantic feature clustering, as illustrated in FIG. 1. The system comprises a welding robot 1, an image acquisition module 2, an edge computing server 3, a programmable logic control module 4 and a robot control module 5; wherein the image acquisition module 2 could be an industrial camera for capturing images of the workpiece to be welded, the edge computing server 3 that performs clustering and recognition of the workpiece images using deep learning algorithms, identifying the type of workpiece to be welded. It utilizes industrial robot parametric programming technology to extract size information and welding process parameters from a database to form the welding program. The programmable logic control module 4 and the robot control module 5 collaborate in interactive control of the welding robot 1 to carry out the welding of workpieces. This method enables the robot welding of workpieces with small batches, various types, large sizes, and complex structures without the need for teaching programming or offline programming.

Figure 2:
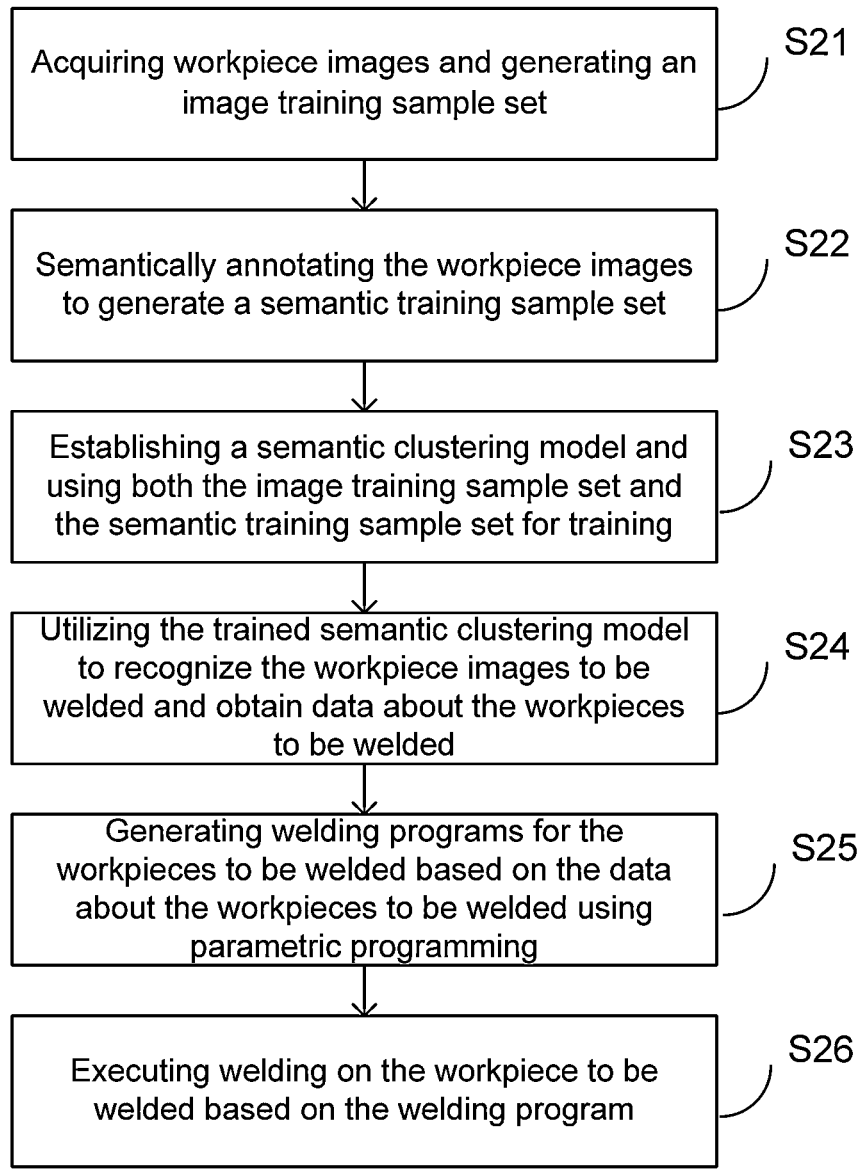
FIG. 2 is a flow chart of a robot welding method based on semantic feature clustering according to the present invention.

Building upon this system, a robot welding method based on semantic feature clustering proposed by the present invention, as shown in FIG. 2, includes the following steps:

Step S21: Acquiring workpiece images and generating an image training sample set.

The image training sample set is directly composed of several workpiece images.

Step S22: Semantically annotating the workpiece images to generate a semantic training sample set.

Semantic labeling of the workpiece involves using features such as structural dimensions and welding process characteristics to label the workpiece images, resulting in a semantic training sample set.

Step S23: Establishing a semantic clustering model and using both the image training sample set and the semantic training sample set for training.

The workpiece images are divided into labeled training sample sets and unlabeled test sample sets, with no overlap between labeled and unlabeled data. The semantic clustering model is trained using the training sample set. Through the association of attributes between the training sample set and the test sample set, the model learns a mapping from shallow features to deep semantic features, which is then applied to the test sample set to obtain its semantic feature representation.

Figure 3:
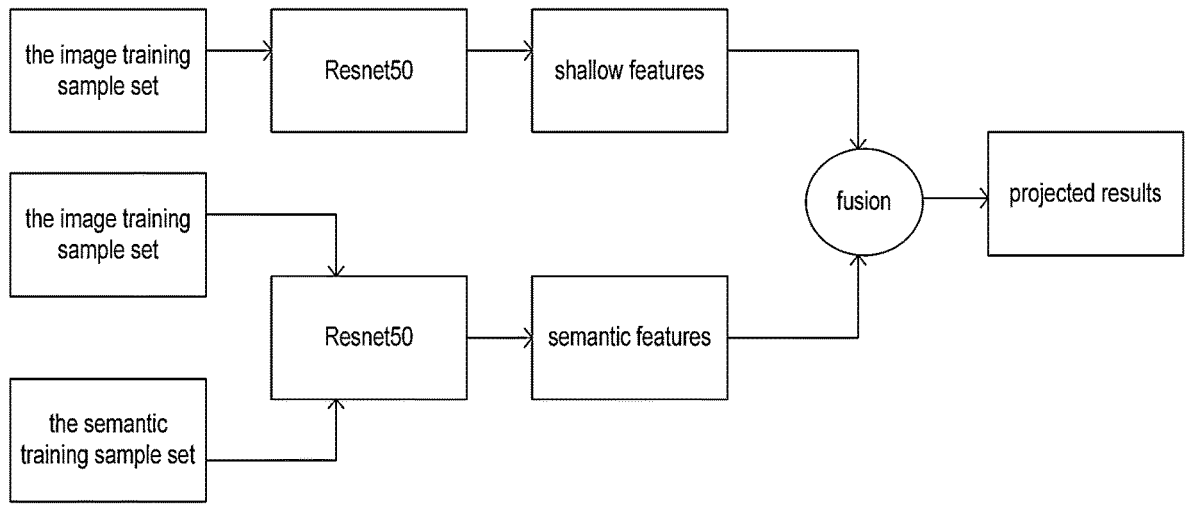
FIG. 3 is a model architecture diagram of a semantic feature clustering model according to the present invention.

In the embodiments of the present invention, the established semantic feature model, as depicted in FIG. 3, employs the Resnet50 model with the image training sample set as input to extract shallow features of the workpiece. The features from the last pooling layer of this model serve as the feature vector representation. Additionally, the Resnet50 model, using both the image training sample set and the semantic training sample set as input, extracts deep semantic features of the workpiece.

The fusion of shallow features and semantic features results in the predicted feature vector representation of the workpiece images.

In some embodiments of the present invention, considering the contributions of these two types of features to image clustering, a weighted overlay fusion method has been designed. This method assigns different weights to the two features based on the clustering results under each individual feature, thus achieving image data clustering in the obtained low-dimensional embedding feature space.

Specifically, based on $$\alpha = \frac{m \times A}{m \times A + m \times B}$$

for assigning weights to semantic features, based on $\beta = 1 - \alpha$ for assigning weights to shallow features, and finally based on $T = \alpha V + \beta U$ for weighted overlay fusion to obtain the fused feature;

Where m represents the number of samples including image training samples and semantic training samples, A represents the clustering results of shallow features, B represents the clustering results of semantic features, $V \in R^{s \times m}$ represents semantic feature expressions, $U \in R^{s \times m}$ represents shallow feature expressions, and s represents the dimensionality of the two feature matrices.

Step S24: Utilizing the trained semantic clustering model to recognize the workpiece images to be welded and obtain data about the workpieces to be welded.

Using the semantic clustering model trained in Step S23, with workpiece images to be welded as input, it recognizes the types of workpieces to be welded. Subsequently, the edge computing server queries a database based on the workpiece type to obtain data about the workpieces to be welded. This data includes structural dimension data, welding process parameters, and more.

Step S25: Generating welding programs for the workpieces to be welded based on the data about the workpieces to be welded using parametric programming.

The specific robot welding method proposed by the present invention, based on semantic feature clustering, allows for the use of variables in programming to efficiently improve programming efficiency and program adaptability. In the embodiments of the present invention, a parameterized programming method is introduced in conjunction with robot welding.

Figure 4:
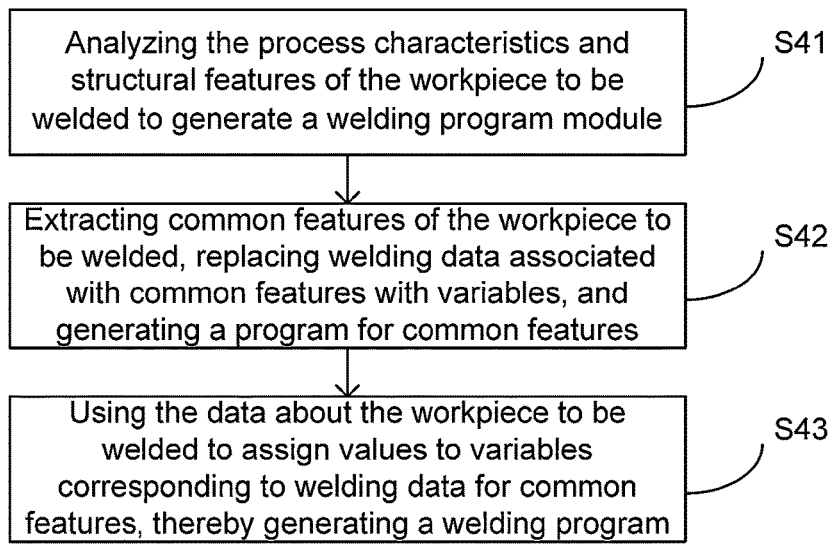
FIG. 4 is a flowchart of the parametric programming of the welding robot according to the present invention.

Initially, through an input interface provided by the robot control module 5, users can input workpiece information for the workpieces to be welded. Based on this information, the system checks whether a welding program for the workpiece already exists in the program database. If the program for the workpiece does not exist, the system suggests a new workpiece task and proceeds with the following steps, as shown in FIG. 4:

Step S41: Analyzing the process characteristics and structural features of the workpiece to be welded to generate a welding program module.

This step involves analyzing the overall process characteristics and structural features of the workpiece to establish a machining program module for the workpiece.

Step S42: Extracting common features of the workpiece to be welded, replacing welding data associated with common features with variables, and generating a program for common features.

This step involves analyzing the basic characteristics of the workpiece to be welded, identifying common features, replacing welding data associated with common features with variables, and writing a program for common features or retrieving an existing program from the database.

A verification and cross-check of the completed program is conducted, and if too many variables are used, programming is performed using a master-subroutine approach.

Step S43: Using the data about the workpiece to be welded to assign values to variables corresponding to welding data for common features, thereby generating a welding program.

Utilizing the data about the workpiece to be welded obtained in Step S24, values are assigned to variables corresponding to welding data for common features, resulting in a common feature program adapted to the workpiece to be welded. After assigning values, a check of the common feature functions is performed, and upon confirmation of correctness, the entire welding program is finalized.

Step S26: Executing welding on the workpiece to be welded based on the welding program.

The robot control module 5 runs the welding program and performs welding on the workpiece to be welded.

In some embodiments of the present invention, a robot parameterized programming system utilizes lower-level robot operation functions. Users can configure the parameterized programming function for workpieces to be welded based on their actual requirements. Operators only need to input data following the software's designated workflow to generate a welding program for the workpiece to be welded. The welding robot executes welding based on the welding program, eliminating the need for teaching programming and offline programming. This approach results in high operational efficiency, programming efficiency, and welding efficiency. It addresses issues related to low precision and efficiency in manual teaching programming and the generality, flexibility, and deviation associated with offline programming.

Based on the robot welding method proposed here, which utilizes semantic feature clustering, and within the robot welding system based on semantic feature clustering proposed by the present invention, the following components are utilized: a welding robot 1 for processing the workpieces to be welded; an image acquisition module 2 for capturing images of the workpieces to be welded; an edge computing server 3 for training the semantic clustering model and using the trained model to recognize the workpieces to be welded and obtain data about the workpieces to be welded; wherein training the semantic clustering model includes semantically annotating workpiece images to generate a semantic training sample set and establishing the semantic clustering model using the image training sample set and the semantic training sample set for training; a programmable logic control module 4 for generating welding programs for the workpieces to be welded based on the data about the workpieces to be welded using parameterized programming; and a robot control module 5 for retrieving the welding program generated by the programmable logic control module and controlling the welding robot to perform welding based on the welding program.

In some embodiments of the present invention, the semantic clustering model is established as follows: using the Resnet50 model with the image training sample set as input to extract shallow features of the workpiece images; using the Resnet50 model with both the image training sample set and the semantic training sample set as input to extract deep semantic features of the workpiece; and fusing the shallow features and semantic features.

In some embodiments of the present invention, the fusion of shallow features and semantic features includes: assigning weights to semantic features based on $$\alpha = \frac{m \times A}{m \times A + m \times B};$$

assigning weights to shallow features based on $\beta = 1 - \alpha$; and finally, obtaining the fused features through weighted overlay fusion based on $T = \alpha V + \beta U$; where m represents the number of samples, A represents the clustering results of shallow features, B represents the clustering results of semantic features, V represents semantic feature expressions, and U represents shallow feature expressions.

In some embodiments of the present invention, the programmable logic control module 4 is specifically used for analyzing the process characteristics and structural features of the workpiece to be welded to generate a welding program module; extracting common features of the workpiece to be welded, replacing welding data associated with common features with variables, and generating a program for common features; using data about the workpiece to be welded to assign values to variables corresponding to welding data for common features, thereby generating a welding program.

The specific method for welding execution in the system has been detailed and is not reiterated here.

It should be noted that in the actual implementation process, the welding method mentioned above can be executed by a processor in hardware form, which executes computer-executable instructions stored in memory in software form. The storage media mentioned above may include volatile memory, such as random-access memory, or non-volatile memory, such as read-only memory, flash memory, hard disk drives, or solid-state drives, or a combination of such memory types.

It should be noted that, in the specific implementation process, the welding methods described above can be executed by a hardware processor using computer-executable instructions stored in memory. Details on this are not elaborated here. Furthermore, the programs corresponding to the actions described above can all be stored in computer-readable storage media in software form for the convenience of the processor to invoke and execute the operations of each module. The computer-readable storage media mentioned in the preceding text can include volatile storage, such as random-access memory RAM. It can also encompass non-volatile storage, such as read-only memory ROM, flash memory, hard drives, or solid-state drives SSD. Additionally, it may involve combinations of these types of storage media.

The processor mentioned earlier can refer to a collective term for multiple processing components. For instance, the processor can be a central processing unit CPU, or it could be other general-purpose processors, digital signal processors, dedicated integrated circuits, field-programmable gate arrays FPGAs, or other programmable logic devices, discrete gates or transistor logic devices, discrete hardware components, and more. General-purpose processors may include microprocessors or any conventional processors. Specialized processors are also included.

The above descriptions represent specific embodiments of the present invention. However, the scope of the present invention is not limited to these embodiments. Any changes or substitutions readily apparent to those skilled in the art within the technological scope disclosed in the present invention should be considered within the scope of protection of the present invention. Therefore, the protection scope of the present invention should be determined by the claims.

The invention claimed is:

1. A robot welding method based on semantic feature clustering, wherein comprising:
    acquiring workpiece images, generating an image training sample set;
    semantically annotating the workpiece images to generate a semantic training sample set;
    establishing a semantic clustering model, using the image training sample set and the semantic training sample set for training;
    utilizing the trained semantic clustering model to recognize workpiece images to be welded, obtaining data about the workpieces to be welded;
    generating welding programs for the workpieces to be welded based on the data about the workpieces to be welded using parameterized online programming; and
    performing welding on the workpieces to be welded based on the welding programs;

wherein the establishment of the semantic clustering model comprises:
using a Resnet50 model with the image training sample set as input to extract shallow features of the workpiece images;
using a Resnet50 model with both the image training sample set and the semantic training sample set as input to extract semantic features of the workpieces; and
fusing the shallow features and semantic features;
wherein the fusion of shallow features and semantic features comprises:
assigning weights to the semantic features based on $$\alpha = \frac{m \times A}{m \times A + m \times B};$$

assigning weights to the shallow features based on β=1−α; and
performing weighted overlay fusion to obtain the fused feature based on T=αV+βU;
wherein, m represents number of samples, A represents clustering results of shallow features, B represents clustering results of semantic features, V represents semantic feature expressions, and U represents shallow feature expressions;
wherein generating welding programs for the workpieces to be welded based on the data about the workpieces to be welded using parameterized online programming comprises:
analyzing process characteristics and structural features of the workpieces to be welded to generate welding program modules;
extracting common features of the workpieces to be welded, replacing welding data associated with common features with variables to generate common feature programs;
using data about the workpieces to be welded to assign values to variables corresponding to welding data for common features, thereby generating welding programs.

2. A robot welding system based on semantic feature clustering, comprising:
a welding robot configured to perform machining on workpieces to be welded;
an image acquisition module configured to capture images of the workpieces to be welded;
an edge computing server configured to train a semantic clustering model and utilize the trained semantic clustering model to recognize images of the workpieces to be welded, obtaining data about the workpieces to be welded; wherein training the semantic clustering model includes semantically annotating workpiece images to generate a semantic training sample set, establishing the semantic clustering model and using the image training sample set and the semantic training sample set for training;
a programmable logic control module configured to generate welding programs for the workpieces to be welded based on the data about the workpieces to be welded using parameterized online programming; and
a robot control module configured to retrieve the welding programs generated by the programmable logic control module and control the welding robot to perform welding based on the welding programs;
wherein establishing the semantic clustering model comprises:
using a Resnet50 model with the image training sample set as input to extract shallow features of the workpiece images;
using a Resnet50 model with both the image training sample set and the semantic training sample set as input to extract semantic features of the workpieces; and
fusing the shallow features and semantic features;
wherein the fusion of shallow features and semantic features comprises:
assigning weights to the semantic features based on $$\alpha = \frac{m \times A}{m \times A + m \times B};$$

assigning weights to the shallow features based on β=1−α; and
performing weighted overlay fusion to obtain the fused feature T=αV+βU;
wherein, m represents number of samples, A represents the clustering results of shallow features, B represents clustering results of semantic features, V represents semantic feature expressions, and U represents shallow feature expressions;
wherein the programmable logic control module is configured
to analyze process characteristics and structural features of the workpieces to be welded to generate welding program modules,
to extract common features of the workpieces to be welded, replace welding data associated with common features with variables to generate common feature programs, and
to use data about the workpieces to be welded to assign values to variables corresponding to welding data for common features, thereby generating welding programs.

* * * * *